United States Patent [19]
Kung

[11] Patent Number: 5,369,796
[45] Date of Patent: Nov. 29, 1994

[54] FLOATING SOUND SYSTEM

[76] Inventor: Gregory E. Kung, 411 Kari Ct., Houston, Tex. 77024

[21] Appl. No.: 926,698

[22] Filed: Aug. 10, 1992

[51] Int. Cl.⁵ .................... H04B 1/06; H04B 1/08
[52] U.S. Cl. .................... 455/344; 455/348; 455/349; 455/350; 455/351; 441/12; 441/32
[58] Field of Search ............. 455/344, 346, 348, 349, 455/350, 351; 381/88, 205; 441/1, 32, 12

[56] References Cited
U.S. PATENT DOCUMENTS

| | | |
|---|---|---|
| 3,162,813 | 12/1964 | Piccinini . |
| 3,182,340 | 4/1962 | Gentile ............... 441/32 |
| 4,138,752 | 2/1979 | Dickson ............... 441/32 |
| 4,503,563 | 3/1985 | Johnson . |
| 4,571,194 | 2/1986 | Kiss et al. ............ 441/1 |
| 4,856,087 | 8/1989 | Nesbit . |
| 5,197,103 | 3/1993 | Hayakawa ............. 381/81 |

FOREIGN PATENT DOCUMENTS

| | | |
|---|---|---|
| 164716 | 7/1988 | Japan ............... 455/349 |
| 2025179 | 1/1990 | United Kingdom . |

*Primary Examiner*—Reinhard J. Eisenzopf
*Assistant Examiner*—Thanh C. Le
*Attorney, Agent, or Firm*—Richard C. Litman

[57] ABSTRACT

A floating sound system for use in a swimming pool or the like has a radio, tape player, power supply, and controls. The power supply unit nests within a toroidal float, being attached thereto by straps. The radio and associated components are located in a domed housing resting upon the float. The sound system is built to disassemble into these three subassemblies. The resultant sound system floats stably in water, and, due to speaker cones arranged parallel to the water surface, projects sound very effectively.

4 Claims, 3 Drawing Sheets

FLOATING SOUND SYSTEM

BACKGROUND OF THE INVENTION

1. Field of the Invention

The present invention relates to a stereo radio and tape playing device, and more particularly to a stereo radio and tape playing device adapted to float in a pool or the like.

2. Description of the Prior Art

Radio and other audio equipment adapted for use in water is known. U.S. Pat. No. 3,162,813, issued to Arnaldo Piccinini on Dec. 22, 1964, and U.S. Pat. No. 4,503,563, issued to Bruce R. Johnson on Mar. 5, 1985, exemplify radio receivers adapted for floating in water during use, including onboard battery. Piccinini discloses external tuning controls and antenna. Johnson discloses inclusion of a cassette deck in his device, and provides a spherical lens depending from a round housing.

U.K. Pat. No. 2,025,179, issued to William Kwok and published on Jan. 16, 1980, discloses a substantially spherical enclosed floating radio receiver.

U.S. Pat. No. 4,856,087, issued to Mark S. Nesbit on Aug. 8, 1989, illustrates waterproof audio equipment to be attached to an inflatable member, such as an air mattress.

None of the above inventions and patents, taken either singly or in combination, is seen to describe the instant invention as claimed.

SUMMARY OF THE INVENTION

It is desirable to provide a fully effective floating sound system well suited for recreational use. The sound system, since its water environment is subject to disturbances to the water surface, should be stable, resisting being tipped over. Sound should be reproduced as faithfully as possible, and distributed over, selectively, as large an area as possible, so that potentially all the users of a pool may enjoy the benefit thereof. Safety concerns demand that the structure avoid sharp exposed edges. Since beverages are frequently consumed by persons using pools, it is desirable to provide a place to hold beverage receptacles without obliging the user to move to the nearest side of the pool.

The present invention provides a floating structure operably housing a stereo radio and tape player, and further including supporting surfaces for beverage receptacles. This arrangement will hereinafter be referred to as a floating sound system.

The novel sound system comprises three major components. The first major component, a dome shaped housing encloses radio or tape player components, and has radio antenna, speakers, and controls projecting to the exterior. A compartment for storage of small personal items has a door disposed on the domed housing.

The second major component is a base including a flange upon which the housing rests, and having a cylindrical compartment extending downwardly to nest in an opening in a float. Enclosed within the cylindrical compartment is a battery pack. The flange optionally has depressions formed therein to hold beverage receptacles, and also includes means to secure the sound system float thereto.

The third major component is a toroidal float having a partial canvas jacket. A plurality of straps attached to the jacket engage the securement means on the flange.

Accordingly, it is a principal object of the invention to provide a floating sound system including sound generating components, external controls and antenna, and an onboard power supply.

It is a second object of the invention to provide a very stable arrangement of a floating sound system.

It is a third object of the invention to provide a floating sound system having speakers which project sound in a direction substantially parallel to the water surface.

Another object of the invention is to provide a floating sound system in which the sound and electrical components are readily detachable from the flotation means.

Still another object of the invention is to provide a floating sound system in which the sound components are readily detachable from the power supply.

A further object of the invention is to provide a floating sound system wherein the power supply nests within a toroidal float.

A still further object of the invention is to provide a floating sound system having readily removable closures to enhance bass sounds.

Yet another object of the invention is to provide a floating sound system usable for temporarily holding beverage receptacles.

Yet a further object of the invention is to provide a floating sound system of generally radially symmetric configuration, having minimal sharp exposed edges.

An additional object of the invention is to provide a floating sound system providing storage space for personal items.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
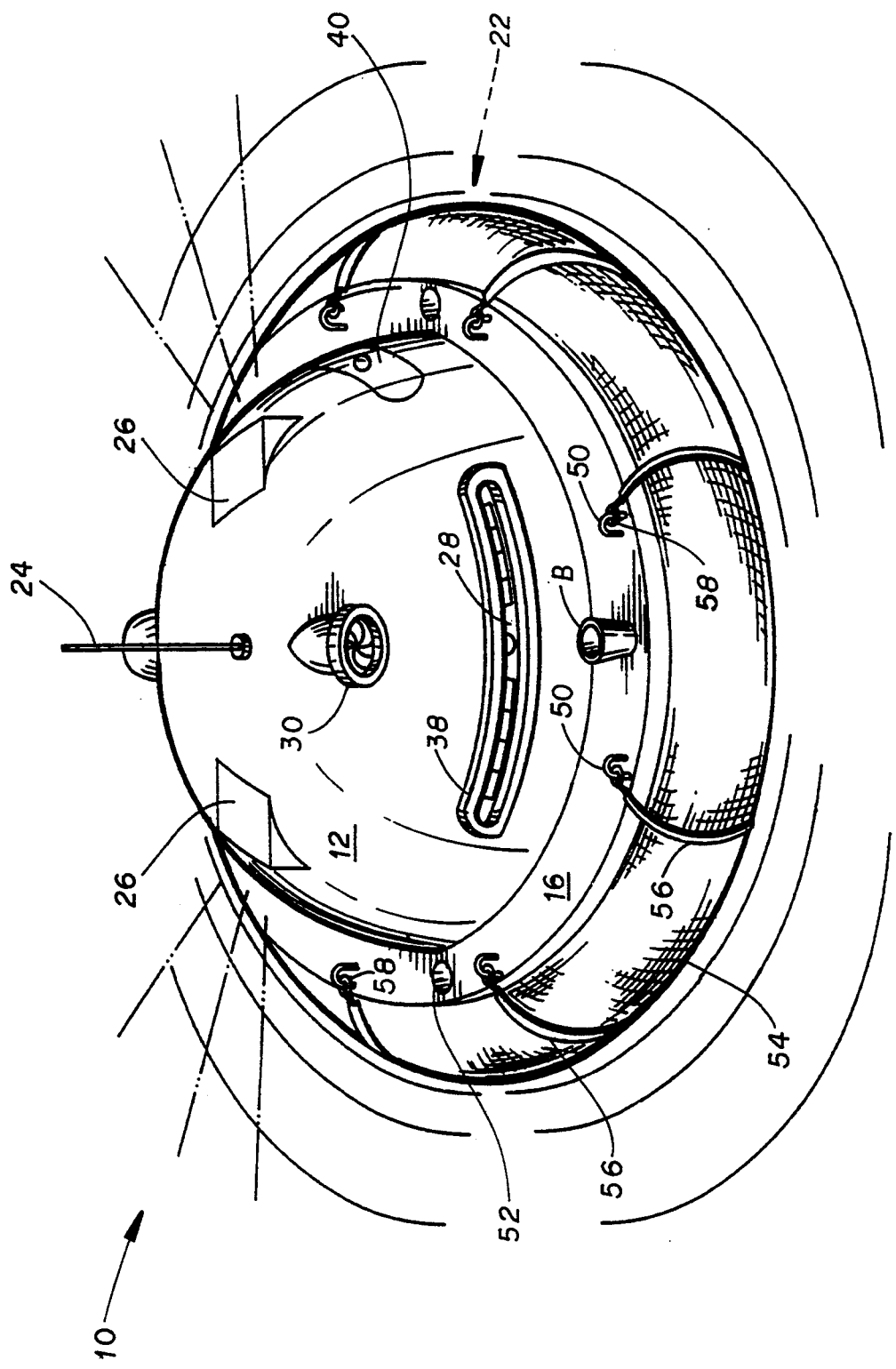
FIG. 1 is an environmental perspective view of the invention.

The present invention 10, seen in its environment in FIG. 1, provides a source of music or similar entertainment immediately at hand to users of a swimming pool.

Figure 2:
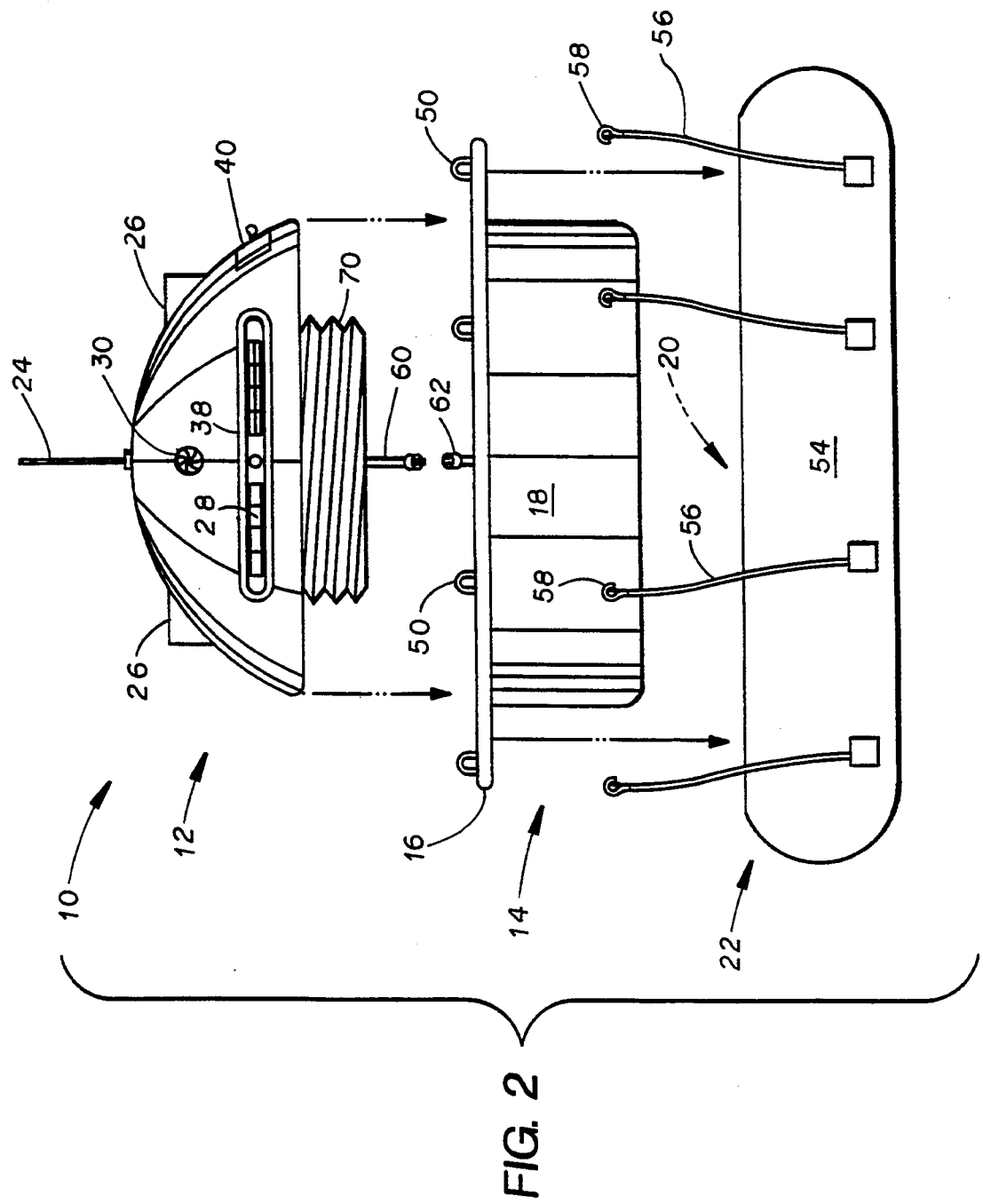
FIG. 2 is a partially exploded side elevational view of the invention.

Three major subassemblies, better seen in FIG. 2, make up the floating sound system 10, and are readily detachable from one another. An audio housing 12 of generally domed configuration, which encloses audio components, is the uppermost subassembly, and threads into the second subassembly, a power supply housing 14 having a flange 16 and a cylindrical body 18. The power supply housing body 14 nests in a central opening 20 of the third subassembly, a toroidal float 22.

Figure 3:
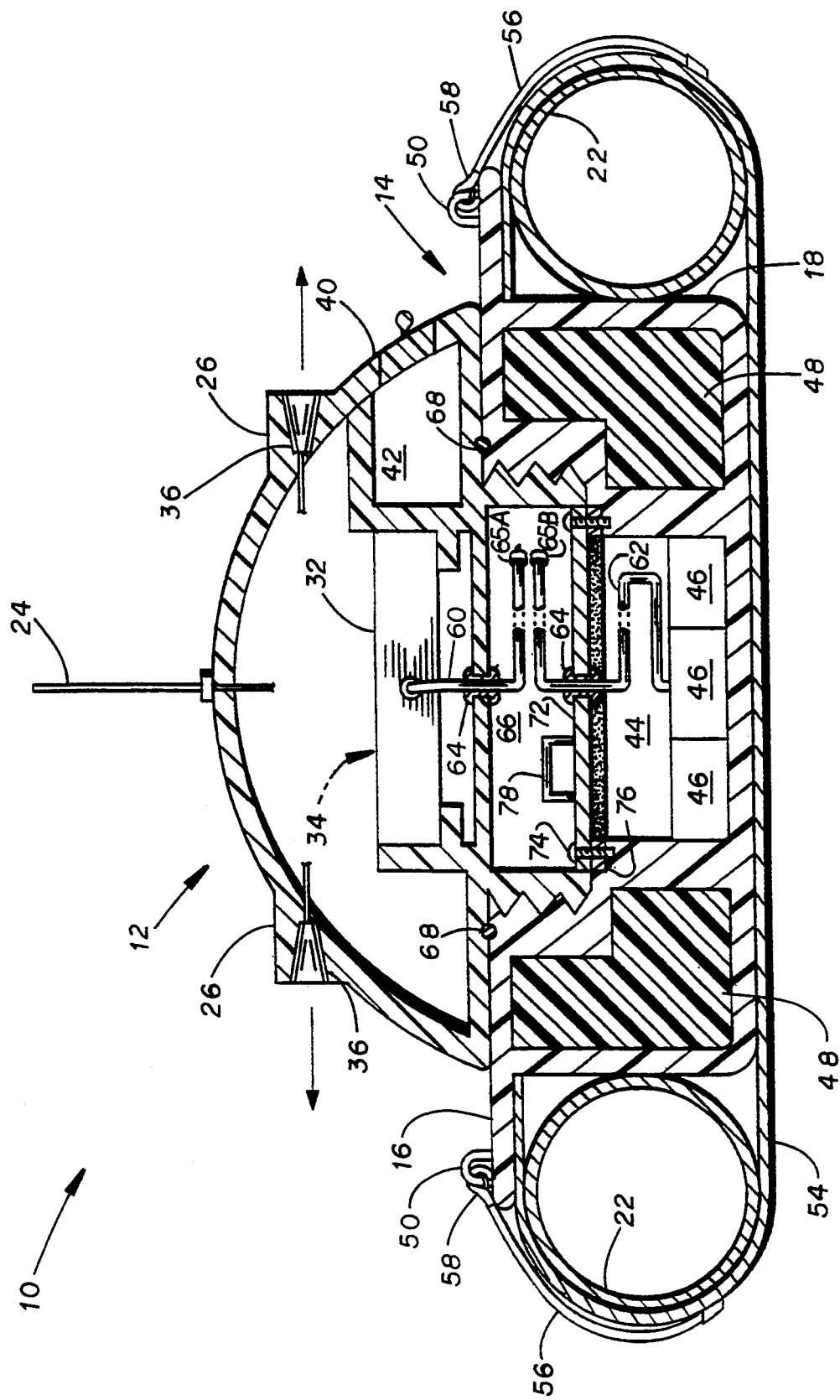
FIG. 3 is a sectional side elevational view of the invention.

Visible and accessible from the exterior of the audio housing 12 are a radio antenna 24, coated to provide protection from water borne chemicals, speakers 26, and controls 28. Rotatably adjustable watertight closures 30 located in the wall of the audio housing 12 are opened to allow sound to propagate. This feature helps preserve fidelity of bass sounds, useful when music is being played. As best seen in FIG. 3, audio equipment enclosed within the audio housing includes radio receiver 32 (understood to include an amplifier), tape player 34, speaker cones 36, and interconnecting wiring (not shown). A compact disc player could be added to or substituted for the radio receiver 32 or the tape player 34. The audio housing 12 is configured partially to surround or otherwise cooperate with components 24,26,28,32,34,36 contained therein.

The speakers 26 are arranged so that the speaker cones 36 project sound (as indicated by arrows in FIG. 3) essentially parallel to the water surface. This causes the sound to carry directly to listeners, and little energy is wasted in projecting sound ineffectually, as would occur if the speaker cones were upwardly oriented. Any number of speakers 26 may be provided, two being illustrated.

A preferred speaker 26 is obtainable from Babbco Ltd., of Dallas, Tex., or a successor thereof. These speakers, which are manufactured under one or more of U.S. Pat. Nos. 3,983,337, 4,115,667, and 4,297,537, or others, have features permitting use in a water environment.

A waterproof membrane 38 (FIGS. 1 and 2) covers the audio equipment controls 28 such that they remain operable, but protected from water and dissolved chemicals. A waterproof closure 40 provides access to a storage space 42, useful for holding small personal items, such as keys, glasses, and cigarettes.

Again referring to FIG. 3, the power supply housing 14 defines a lowermost chamber 44 to house batteries 46. It has been found that three commerically available, gel cell, 12 volt batteries have proved satisfactory in powering the electrically operated audio components 26,32,34. An idle chamber 48 surrounding the battery chamber 44 is filled with expanded foam material to preclude waterlogging, thus preserving buoyancy. Flange 16 rests on the float 22, and includes rings 50 for attaching the float 22 thereto. In the preferred embodiment of the invention, depressions 52, seen in FIG. 1, formed in the flange 16 hold beverage receptacles B, so that users can, from time to time, set down a drink without having to exit the pool.

The float 22 has a canvas jacket 54 covering its sides and bottom. Straps 56 sewn to the jacket 54 extend upwardly and terminate in hooks 58 to engage rings 50 so that the power supply housing 14 is secured to the float 22.

Turning now to FIG. 2, a first power cord 60 leading to the audio components 32,34 extends downwardly from the audio housing 12 to plug into a second power cord 62, which is connected to batteries 46 enclosed within the power supply housing 14. As seen in FIG. 3, each power cord 60 or 62 is sealed by a gland 74 as it exits its respective housing 12 or 14. The power cords 62,64 are joined by male and female plugs 65A,65B in a chamber 66 defined between the audio housing 12 and the power supply housing 14.

Redundant isolation of the batteries 46 from water is provided by, first, an O-ring 68 disposed outside audio housing threads 70 and between the audio housing 12 and the power supply housing 14. A hatch 72, secured by screws 74 and sealed by a gasket 76, closes the battery chamber 44. The hatch 72 and its associated gasket 76 thus provide a second barrier to water which might penetrate the seal provided by O-ring 68 (FIG. 2). A handle 78 is provided to lift and maneuver the hatch 72. The power cord 62 connected to the batteries 46 is sufficiently long to permit putting the hatch 72 aside after removal to provide access to the batteries 46.

The resultant floating sound system 10 is very stable, due to the pyramidal arrangement (lowermost components having the greatest length and width) and the location of batteries 46 adjacent the lowermost surface of the floating sound system 10 creating a low center of gravity. It is easily operated, since audio equipment controls 28 and closures 30,40 are located substantially on a vertical plane, enabling convenient finger contact.

It is to be understood that the present invention is not limited to the embodiments described above, but encompasses any and all embodiments within the scope of the following claims.

I claim:

1. A floating sound system including flotation means having length, width and height dimensions, uppermost audio equipment retained within said flotation means, said audio equipment including a housing having length, width and height dimensions, and an onboard power supply including a housing having length, width and height dimensions, said audio housing attaching solely to said power supply housing, said lowermost flotation means having length and width dimensions exceeding said length and width dimensions of said audio housing and of said power supply housing, said flotation means having top and bottom surfaces and also having means defining an opening therein, whereby said flotation opening laterally surrounds said power supply housing, said flotation means further being covered on sides and bottom thereof by a flexible cover, said flexible cover having straps terminating in fasteners attached thereto, and said power supply housing having an upper flange, a cylindrical body and battery means, said cylindrical body enclosing said battery means and being laterally surrounded by said flotation means, and said flange contacting and covering said top of said flotation means, said power supply housing flange having a plurality of rings engageable with said flotation strap fasteners, whereby said flotation means are readily attachable to and detachable from said power supply housing, said power supply further being located adjacent the bottom surface of said flotation means, whereby said floating sound system has a low center of gravity and floats stably on a surface of water, said audio equipment including speaker means having speaker cones, said speaker cones being positioned radially opposite each other and located a sufficient distance above the surface of the water so that sound emitted therefrom propagates in diametrically opposite directions generally parallel to the surface of the water, said audio equipment also having ready detachment means cooperating with said power supply, whereby said audio equipment is readily detachable from said power housing, said audio equipment housing further being generally of domed configuration, said housing thus being radially symmetric and substantially unencumbered by sharp edges, said audio housing also having at least one readily opened closure enabling atmospheric communication between the interior of said audio housing and the exterior thereof, whereby transmission of bass sound is enhanced.

2. The floating sound system of claim 1, said power supply housing flange further including at least one depression corresponding to dimensions of a beverage formed therein, whereby beverage receptacles are temporarily stored and held.

3. The floating sound system of claim 1, said audio housing having threads and said power supply housing having corresponding threads, whereby said audio housing and said power supply housing threadedly connect to one another.

4. A floating sound system including lowermost flotation means having length, width and height dimensions, uppermost audio equipment retained within said flotation means, said audio equipment including a housing having length, width and height dimensions, and an onboard power supply including a housing having length, width and height dimensions, said audio housing attaching solely to said power supply housing, said lowermost flotation means having length and width dimensions exceeding said length and width dimensions of said audio housing and of said power supply housing, said flotation means having top and bottom surfaces and means defining an opening therein, whereby said flotation opening laterally surrounds said power supply housing, said flotation means further being covered on the sides and on the bottom by a flexible cover, said flexible cover having straps terminating in fasteners attached thereto, said power supply housing having an upper flange defining at least one depression therein, said depression conforming to the shape of a beverage receptacle, whereby said floating sound system is able to hold a beverage receptacle thereon, a cylindrical body and battery means, said cylindrical body enclosing said battery means and being laterally surrounded by said flotation means, said cylindrical body being open at the top and having a hatch and gasket closing and sealing said cylindrical body, thus providing redundant sealing means against ingress of water, said flange contacting and covering said flotation top surface, said power supply housing flange having a plurality of rings engageable with said flotation strap fasteners, whereby said flotation means are readily attachable to and detachable from said power supply housing flange, said power supply further being located adjacent the bottom surface of said flotation means, whereby said flotation sound system has a low center of gravity and floats stably on a surface of water, said audio equipment including speaker means having speaker cones, said speaker cones being positioned radially opposite each other and located a sufficient distance above the water so that the sound emitted therefrom propagates in diametrically opposite directions generally parallel to the surface of the water, said audio equipment also having ready detachment means comprising a threaded member, said power supply having threads cooperating with said audio equipment threaded member, whereby said audio equipment is readily detachable from said power supply housing, said power supply having a first power cord and said audio equipment having a second power cord, said first and second power cords having cooperation plugs, said audio equipment housing further being generally of domed configuration, said audio housing thus being radially symmetric and substantially unencumbered by sharp edges, said audio housing also having at least one readily opened closure enabling atmospheric communication between the interior of said audio housing and the exterior thereof, whereby transmission of bass sound is enhanced.

* * * * *